United States Patent [19]
Hardy et al.

[11] 4,042,433
[45] Aug. 16, 1977

[54] APPLIQUEING SYNTHETIC RESINS ON SHEET MATERIAL

[75] Inventors: Henry Hardy, Cambridge; Adrian E. Balfour, Framingham, both of Mass.

[73] Assignee: Compo Industries, Inc., Waltham, Mass.

[21] Appl. No.: 593,715

[22] Filed: July 7, 1975

[51] Int. Cl.² ............ B32B 31/00; B29C 19/04; B29H 5/26

[52] U.S. Cl. .................. 156/87; 156/273; 156/298; 264/26

[58] Field of Search ............ 156/273, 380, 285, 286, 156/298, 583, 87; 264/46.4, 26, 102

[56] References Cited

U.S. PATENT DOCUMENTS

| | | | |
|---|---|---|---|
| 2,422,979 | 6/1947 | Pecker | 156/273 |
| 2,914,109 | 11/1959 | Hsu et al. | 156/273 |
| 2,946,713 | 7/1960 | Dusina, Jr. et al. | 264/26 |
| 3,238,078 | 3/1966 | Baldwin | 156/87 |
| 3,597,293 | 8/1971 | Willett | 156/286 |
| 3,870,582 | 3/1975 | Brackett | 156/583 |
| 3,944,454 | 3/1976 | Burgheimer | 156/273 |

Primary Examiner—Douglas J. Drummond
Attorney, Agent, or Firm—Dike, Bronstein, Roberts, Cushman & Pfund

[57] ABSTRACT

The method of appliqueing sheet material, in particular, bonding a synthetic resin such as polyvinyl chloride to one or more portions of a woven fabric, comprising supporting the synthetic resin applique in compressive engagement with the sheet material in a high frequency field at a temperature such as to cause fusing and bonding of the applique to the sheet material and while fusing the synthetic resin of the applique conducting vapors generated within the sheet material by said high frequency heating away from the sheet material to allow the use of a level of power to cause the synthetic resin to penetrate into the sheet material and to prevent condensation of the vapors on the platens of the high frequency press employed to effect bonding.

2 Claims, 18 Drawing Figures

APPLIQUEING SYNTHETIC RESINS ON SHEET MATERIAL

BACKGROUND OF INVENTION

Textiles are used extensively in the manufacture of shoe uppers, handbags, luggage, wearing apparel and the like and to provide for decoration and/or reinforcement, pre-cut pieces of sheet thermoplastic are laminated to the textile by a process of flow molding employing silicone rubber molds and a high frequency press. This method has not been entirely successful for the reason that there is at almost all times moisture contained in the fabric of the textile so that during high frequency heating necessary to cause the synthetic resin to flow and penetrate into the fabric, the moisture is turned into steam and condenses on the cool platens of the high frequency press, creating drops of water which cause arcing between the press platens which damage the article being molded and also may damage the mold itself. In the past, it has been found that a power level of the high frequency generator which will not cause this moisture production and arcing is not sufficient to heat the synthetic resin sufficiently to penetrate into the fabric. It is the purpose of this invention to overcome these difficulties and provide a process by which parts of sheet thermoplastic can be caused to penetrate into and laminate to fabrics during high volume production without damage to the parts being made or the molds being used.

SUMMARY OF INVENTION

As herein illustrated the method comprises supporting a synthetic resin applique of appropriate configuration in compressive engagement with sheet material to which it is to be laminated in a high frequency field for heating at a temperature to cause fusing and bonding of the synthetic resin of the applique to the sheet material and while so heating the assembly absorbing the vapors generated in the sheet material by such heating so as to induce penetration of the synthetic resin into the sheet material and avoid arcing in the high frequency field. A mold containing a cavity corresponding in configuration to that of the applique is employed to hold the applique in engagement with the sheet material during bonding and the pressure and heating to effect bonding is accomplished between the platens of a press provided with means for cooling the platen and with means for producing a high frequency field between the platens at a power level to convert the moisture in the fabric to steam. In order to absorb the vapors generated in the sheet material during heating and open cell absorbent porous sheet is placed between the back side of the sheet material and the press platen at that side, and in order to prevent sticking of the back side of the sheet material to the open cell absorbent porous sheet a porous release sheet is placed between the sheet material and the open cell absorbent porous sheet. The porosity of the release sheet allows the vapors to escape from the sheet material into the open cell porous absorbent sheet. The sheet material of which the applique is comprised may be selected to contain a blowing agent activatable at the temperature of fusing so as to cause expansion of the applique while in contact with the sheet material and penetration of the synthetic resin of the applique into the sheet material.

The invention will now be described in greater detail with reference to the accompanying drawings, wherein.

A major problem in applying sheet synthetic material such as a synthetic resin to a woven fabric base for the manufacture of tennis shoe uppers, handbags, luggage, apparel and the like has been to secure a satisfactory bond between the synthetic resin and the fabric and as referred to above it has now been found that the presence of vapors, in particular steam vapors, developed at the interfaces between the synthetic resin and the textile at the temperature and power level of the high frequency heating are responsible in large part for failure of the synthetic resin to become bonded to the fabric. If a lower temperature or power level is employed to avoid generation of these vapors the desired penetration of the synthetic resin will not take place. Also, as related above, at the higher temperature and power level which is necessary to melt the synthetic resin and induce penetration of the synthetic resin into the fabric the vapors which are generated will condense on the relatively cool press platens and this will cause arcing between the press platens which damages the article being molded and the mold itself.

When using a 20 kilowatt high frequency generator at a 40% output which is sufficient to melt the synthetic resin without converting the moisture in the fabric into steam the cooling effect of the platens conducts heat away from the synthetic resin so fast that it does not remain sufficiently liquid to penetrate into the fabric and become bonded thereto. If, however, the power level of the high frequency generator is raised to approximately 70% output to compensate for the loss and thus to maintain the synthetic resin at a liquid so as to produce penetration, vapors and in particular steam is generated in the fabric which must be removed to allow the synthetic resin to penetrate into the fabric and to prevent condensation on the press platens and arcing.

Figure 6:
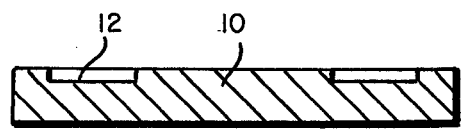
FIG. 6 is a section taken on line 6—6 of FIG. 5.

To obtain the desirable bond, that is, penetration at the interfaces of the synthetic resin and the fabric, and at the same time, to eliminate the danger of arcing, the method according to this invention is carried out as follows. First, as shown in FIG. 6, a mold 10 is prepared embodying a recessed pattern 12 corresponding in configuration to the applique which is to be applied. The mold is comprised of a suitable material which has a low dielectric constant, for example, a silicone rubber.

Figure 5:
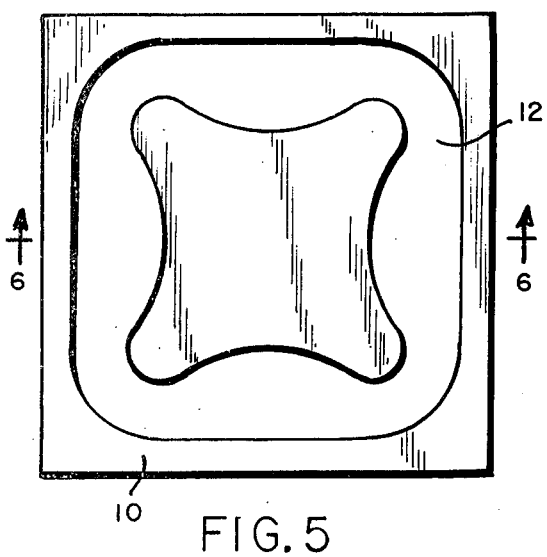
FIG. 5 is a plan view of a mold prepared to make the part shown in FIG. 4.
Figure 7:
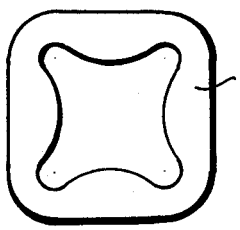
FIG. 7 is a plan view of a die cut sheet of synthetic resin which is to form the applique.
Figure 8:
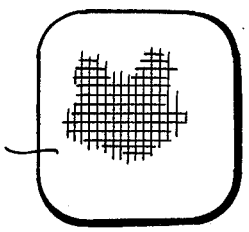
FIG. 8 is a die cut sheet of fabric to which the applique is to be bonded.
Figure 9:
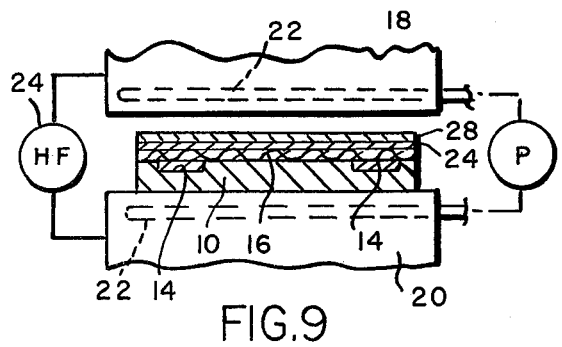
FIG. 9 shows an assembly of a mold with the applique placed therein, the fabric sheet placed over the mold, a release sheet and a foam sheet at the back side of the fabric sheet, between the platens of a press which is provided with means for cooling the press platens and means for producing a high frequency field between the press platens.

Having prepared a mold as shown in FIGS. 5 and 6 a sheet of synthetic resin, for example vinyl, is die cut to the configuration of the applique as shown at 14, FIG. 7, and this is dropped into the mold cavity 12. A sheet of base fabric 16 to which the applique is to be applied is die cut to the proper configuration as shown in FIG. 8 and this is placed on the face of the mold, as shown in FIG. 9. The assembly comprising the mold, the applique and the base fabric is then placed between the platens 18 and 20 of a press provided with cooling conductors 22 and means HF for producing a high frequency field between the platens. A 20 kilowatt generator has been found to be adequate.

In accordance with this invention, in order to conduct away the vapors and/or steam that are generated within the base fabric during the high frequency heating so as to permit penetration of the synthetic resin of the applique into the base fabric and also to prevent the escaping vapors and/or steam from condensing on the surfaces of the platens 18, 20 which would result in arcing, there is placed at the back side of the base fabric a porous release sheet 24, FIG. 9, and an open cell absorbent foam sheet 28. The release sheet is placed between the base fabric and the porous absorbent sheet to prevent sticking of the penetrated synthetic resin to the porous absorbent sheet. The porosity of the release sheet allows the vapor and/or steam generated during heating to pass through it, some of which flows laterally away from the assembly and some directly through into the absorbent foam sheet 28. The absorbent foam sheet provides a trap within which the vapors and/or steam are condensed and are held during the bonding operation. During the stripping and reloading period the moisture absorbed by the foam sheet evaporates fast enough to permit continuous cycling of the operation without build-up of water.

Figure 10:
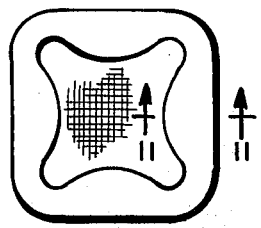
FIG. 10 is a plan view of the finished article after it has been stripped from the mold.
Figure 11:
FIG. 11 is a section taken on the line 11—11 of FIG. 10.
Figure 12:
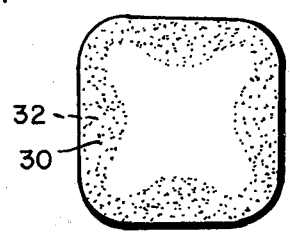
FIG. 12 is a plan view of the back side of the article showing the penetration of the synthetic resin.
Figure 13:
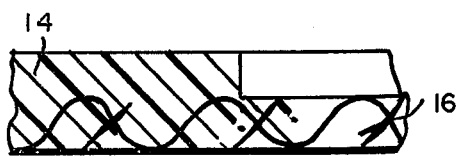
FIG. 13 is a fragmentary section showing the penetration of the synthetic resin through the fabric sheet.

The assembly comprising the mold 10, applique 14, base sheet 16, release sheet 24 and foam sheet 28 is subjected to pressure between the platens of the press and to heating in a high frequency field developed between the platens to a temperature such as to cause the synthetic resin of the applique to melt at the interfaces of the applique and the fabric and to penetrate into the fabric, part or all of the way through. The assembly is maintained in the high frequency field at a power output of approximately 70% employing a high frequency generator having a power output of 20 kilowatts for a period of at least 5 to 15 seconds after which it is held under pressure for cooling and then the release sheet and foam sheet are stripped from the back of the base fabric and the composite structure comprising the base fabric with the applique bonded thereto is stripped from the mold. FIG. 10 shows the composite structure in plan view and FIG. 11 is a section on the line 11—11 of FIG. 10 showing the penetration of the synthetic resin into the base fabric. The penetration of the synthetic resin through the base fabric to the back side is shown by the dots 32, FIG. 12, and in the enlarged fragmentary section of FIG. 13.

The structure as thus fabricated is unique in that there is substantially 100% penetration of the synthetic resin of the applique at the interfaces and hence substantially no voids, that is, unattached areas at the interfaces between the applique and the sheet material. It is accordingly considered that in another aspect invention resides in a structure comprising a fabric base to which there is laminated a synthetic resin applique in which there is penetration of the synthetic resins of the applique into the fabric throughout substantially 100% of the area of contact of the surface of the applique with the fabric.

While the method illustrated herein is described particularly for the bonding of appliques of synthetic resin to woven materials it can also be employed to bond appliques of synthetic resins to other synthetic resins in sheet form and to materials other than synthetic resins such as leather, reconstituted leather, paperboard, paper, felt and the like.

In the practice of the method it is possible to obtain a variety of color combinations by selecting the base material of one color and the appliques of one or more colors.

The silicone mold illustrated herein may be made in any suitable fashion as shown, for example, in U.S. Pat. No. 3,832,111 with a surface formed to provide for reproducing a grain surface and/or stitching on the finished surface of the applique.

The synthetic resin sheet, which may be a thermoplastic such as polyvinylchloride, from which the appliques are die cut is preferably in the order of 0.01 to 0.03 inches thick which is comparable in thickness to the fabric.

The porous release sheet is commercially available and may be obtained in sheet form and cut to the size of the sheet material or may be applied to the sheet material and cut together with the sheet material to the shape of the article to be made. The release sheet may be used repeatedly, which represents a substantial saving in cost.

The foam sheet employed may be open cell silicone sponge rubber or polyurethane foam of approximately ¼ inch thickness.

The silicone sponge rubber or polyurethane foam serve not only to trap the steam and hence prevent it from condensing on the platens, but also to provide a heat insulator which prevents heat from escaping so rapidly to the platens as to interfere with bonding of the synthetic resin to the fabric.

Figure 1:
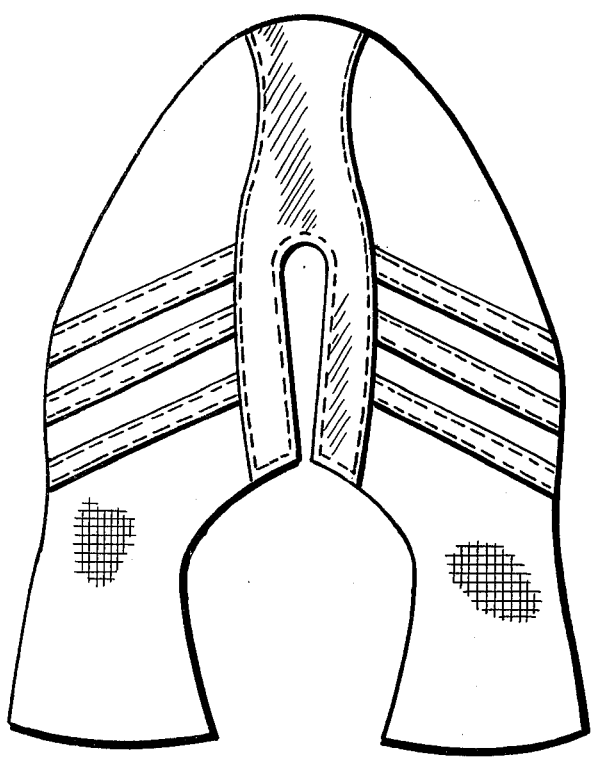
FIG. 1 is a plan view of a shoe upper comprised of fabric to the surface of which has been bonded according to this method an eyelet stay and reinforcing stays.
Figure 2:
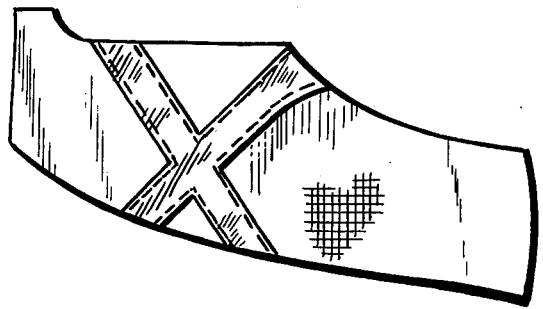
FIG. 2 is a plan view of a portion of a shoe upper comprised of fabric to which has been bonded by this method decorative reinforcements, in this instance a stylized letter of the alphabet.
Figure 3:
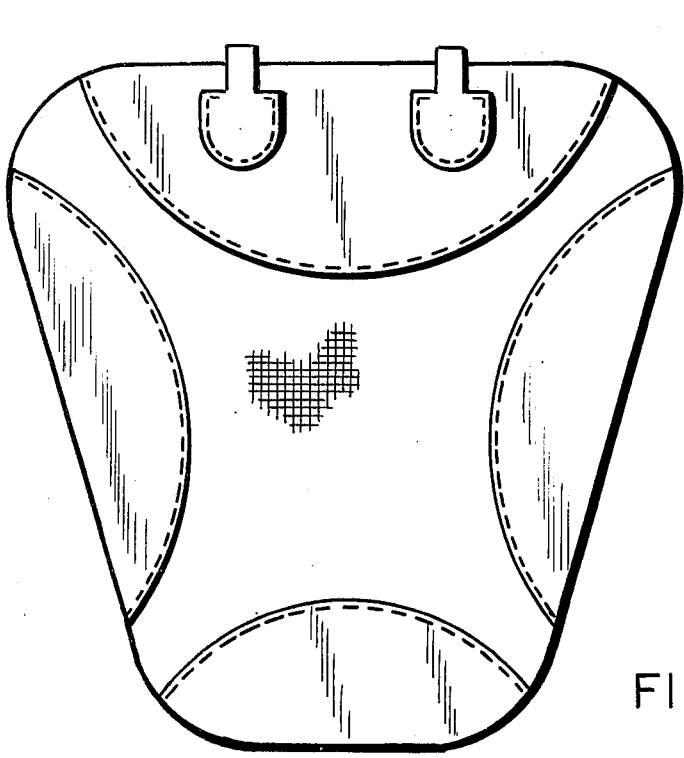
FIG. 3 is a plan view of one component side of a bowling bag decorated with appliques bonded according to the method herein illustrated.
Figure 4:
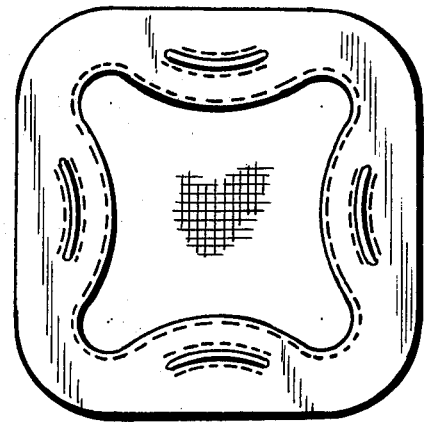
FIG. 4 is a plan view of a portion of an article comprised of fabric to which an applique of synthetic resin is bonded marginally.
Figure 14:
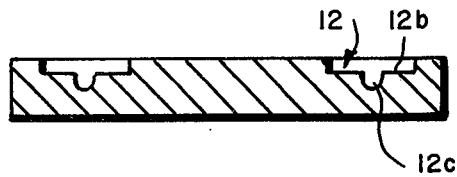
FIG. 14 is a section through a mold for forming appliques having different surface levels.
Figure 15:
FIG. 15 is a section through a part produced by the mold shown in FIG. 14.
Figure 17:
FIG. 17 is a section showing an applique with a porous release sheet applied to one side for use in practicing the method, and, FIG. 18 is a section of an applique with a porous release sheet applied to one side and with an open cell absorbent sheet applied to the release sheet for use in the practice of the method.
Figure 18:
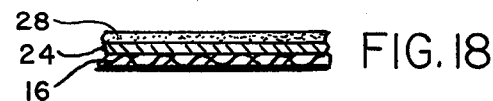

While the appliques shown in FIGS. 1, 2 and 3 are all of uniform thickness it is within the scope of the invention to form the appliques for attachment to the fabric with portions of different thickness. For this purpose a mold such as shown in FIG. 14 is employed wherein the recessed pattern 12a of the applique comprises a first depression 12b and a second depression 12c. In carrying out the method of the invention with such a two level mold cavity a sheet of synthetic resin is pre-cut to the configuration of the cavity which is slightly thicker than the depth of the recess 12b so that when the base fabric is placed on the face of the mold and the assembly is subjected to pressure and high frequency heating there will not only be penetration of the synthetic resin into the base fabric but also penetration of the synthetic resin into the recesses 12c so that the applique in the finished article has a raised portion 34 as shown in FIG. 15.

It may also be desirable in the practice of the method to use a synthetic resin for the applique which contains a blowing agent activatable at the temperature of the high frequency heating to produce a certain amount of expansion so that there will be of certainty pressure at the interfaces of the applique and the base fabric over the entire area in addition to that produced by the press platens. This added pressure will insure intimate contact between the surfaces at the interfaces in spite of any local variations in thickness.

Figure 16:
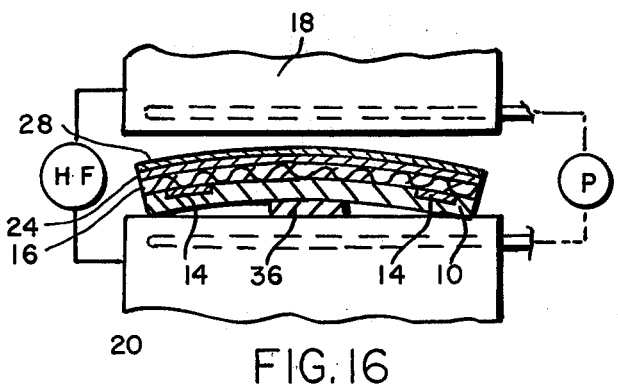
FIG. 16 shows an arrangement of the mold and fabric which insures expelling air from the interfaces as pressure is applied.

The areas of the base fabric and the applique are relatively large and it is quite possible when the assembly is mounted between the press platens and the latter are brought together that contact of high spots may trap air between the surfaces which will prevent suitable bonding. To avoid this, as shown in FIG. 16, a strip of low density urethane foam 36 may be placed on the lower platen 20 of the press and the assembly comprising the mold 10, the base fabric 16, the release sheet 24 and the foam sheet 28 placed astride the strip 36 so that the upper surface of the mold is upwardly convex. When pressure is applied by the upper platen 18 the first contact takes place midway between the opposite sides of the mold so that any air which may be present is squeezed laterally and progressively from between the interfaces of the several parts until the entire assembly is flat. The strip 36 is completely compressed at the pressures employed so as to be substantially non-existent.

The method as thus described provides for making appliques to fabrics which will withstand scuffing, cleaning and the like throughout the life of the article without becoming detached, provides for multi-color treatment and enables manufacture without damage to the part being produced and to the equipment used in its production.

It should be understood that the present disclosure is for the purpose of illustration only and includes all modifications or improvements which fall within the scope of the appended claims.

We claim:

1. The method of bonding an applique of thermoplastic synthetic resin to a permeable substrate of woven material comprising depositing the applique to be applied to the woven material in the cavity of a silicone rubber mold containing a cavity corresponding in configuration to the applique, superimposing upon the surface of the mold across the cavity therein and in engagement with the applique situated in the cavity, the woven material, a porous release sheet, and an open cell absorbent sheet, placing the assembly comprising the mold containing the applique, the woven sheet, the release sheet, and the absorbent sheet between the platens of a high frequency press and while maintaining the platens at a temperature below the fusion temperature of the synthetic resin of the applique, applying pressure to the assembly and simultaneously subjecting the assembly to high frequency heating at a pressure level such as to fuse the synthetic resin, drive such vapors as are generated in the woven material through the release sheet and induce penetration of the fused synthetic resin into the woven material and while subjecting the assembly to heating between the platens, trapping the generated vapors penetrating the release sheet within the absorbent sheet.

2. A method according to claim 1, comprising employing a synthetic resin for the applique containing a blowing agent.

* * * * *